United States Patent [19]

Nagaoka et al.

[11] Patent Number: 5,561,199
[45] Date of Patent: Oct. 1, 1996

[54] RESIN COMPOSITION

[75] Inventors: Kenji Nagaoka, Ichihara; Satoru Gotoh, Sodegaura, both of Japan

[73] Assignee: Sumitomo Chemical Company, Ltd., Osaka, Japan

[21] Appl. No.: 562,751

[22] Filed: Nov. 27, 1995

Related U.S. Application Data

[63] Continuation of Ser. No. 53,005, Apr. 27, 1993, abandoned.

[30] Foreign Application Priority Data

Apr. 30, 1992 [JP] Japan ..................... 4-111266

[51] Int. Cl.$^6$ .................................... C08G 65/48
[52] U.S. Cl. .................. 525/395; 524/494; 524/540; 525/390; 525/392; 525/534; 525/535
[58] Field of Search .................. 524/494, 540; 525/390, 392, 395, 534, 535, 537

[56] References Cited

U.S. PATENT DOCUMENTS

| | | | |
|---|---|---|---|
| 4,738,991 | 4/1988 | Narayan | 521/124 |
| 4,929,665 | 5/1990 | Inoue et al. | 524/500 |
| 5,026,764 | 6/1991 | Okabe et al. | 524/540 |
| 5,028,656 | 7/1991 | Okabe et al. | |

FOREIGN PATENT DOCUMENTS

| | | |
|---|---|---|
| 0368413 | 5/1990 | European Pat. Off. . |
| 0472960 | 3/1992 | European Pat. Off. . |
| 0542296 | 5/1993 | European Pat. Off. . |
| 7822392 | 12/1975 | Japan . |
| 58-157859 | 9/1983 | Japan . |
| 1-266160 | 10/1989 | Japan . |
| 2-075656 | 3/1990 | Japan . |
| 149449 | 1/1991 | Japan . |
| 4-059871 | 2/1992 | Japan . |
| 2218996 | 11/1989 | United Kingdom . |

OTHER PUBLICATIONS

Patent Abstracts of Japan, vol. 15, No. 133 (C–0280), 2 Apr. 1991, & Jp–A–30 17 153 (Mitsubishi Gas Chem Co), 25 Jan. 1991.

*Primary Examiner*—Edward J. Cain
*Attorney, Agent, or Firm*—Watson Cole Stevens Davis, P.L.L.C.

[57] ABSTRACT

A resin composition having an excellent impact property comprising a polyphenylene ether and a polyarylene sulfide is provided. The resin composition comprises (A) a polyphenylene ether and (B) a polyarylene sulfide having the terminal SM group (wherein M is hydrogen or an alkali metal) of at least $5\times10^{-6}$ gram equivalents/g.

8 Claims, No Drawings

RESIN COMPOSITION

This application is a continuation of application Ser. No. 08/053,005, filed Apr. 27, 1993 now abandoned.

BACKGROUND OF THE INVENTION

1. Field of the Invention

The present invention relates to a resin composition and more particularly to a thermoplastic resin composition having an excellent impact resistance comprising a polyphenylene ether and a polyarylene sulfide as main resin components.

2. Related Art Statement

Polyphenylene ethers are resins having excellent mechanical and electrical properties and high heat resistance but have the defect of poor moldability and poor solvent resistance. It is therefore under the situation that for utilization of polyphenylene ethers alone, its range is greatly restricted.

On the other hand, polyarylene sulfides represented by polyphenylene sulfide are one of resins classified into heat resistant resins and are known to have, in addition to high temperature tolerable for continuous use and high rigidity, the properties that they have high flowability, fire retardant properties and excellent solvent resistance. Polyarylene sulfides have thus been widely used as various molded products or films for practical purpose. However, these polyarylene sulfides are poor in mechanical strength, especially in impact strength. Such a defect is a serious obstacle to broadening the utility to a broader range.

Under the situations, it is a valuable attempt, from an industrial viewpoint, to develop resin compositions with benefit of the properties of each component by blending polyphenylene ethers and polyarylene sulfides each having excellent properties. Indeed, such proposal has already been made (Japanese Patent KOKOKU No. 56-34032). In general, however, since the compatibility between polyphenylene ethers and polyarylene sulfides is low, it is practically difficult to obtain resin compositions having excellent mechanical properties by simply blending the two polymers.

To improve the foregoing problems, there have been proposed the following resin compositions: a resin composition comprising polyphenylene ether, polyarylene sulfide and epoxy resin (Japanese Patent KOKOKU No. 60-11063), a resin composition comprising modified polyphenylene ether and polyarylene sulfide (Japanese Patent KOKAI No. 64-36645), a resin composition comprising modified polyphenylene ether, modified polyarylene sulfide and a binder (Japanese Patent KOKAI No. 1-266160), a resin composition comprising modified polyphenylene ether modified by an unsaturated carboxylic acid or an unsaturated carboxylic acid anhydride, polyarylene sulfide and a polyisocyanate compound, or a resin composition comprising polyphenylene ether, polyarylene sulfide, a modifying agent which is an unsaturated carboxylic acid or an unsaturated carboxylic acid anhydride, and a polyisocyanate compound (Japanese Patent KOKAI No. 2-49023), a resin composition comprising a modified polyphenylene ether modified with an organic compound containing an ethylenic double bond and a carboxyl group or an acid anhydride group, and a polyphenylene sulfide in which free SH terminal group is present in a concentration of $10 \times 10^{-6}$ gram equivalents/g or more (Japanese Patent KOKAI No. 3-17153), etc. However, these compositions proposed before are not satisfactory in terms of impact resistance. In addition, either polyphenylene ether or polyarylene sulfide or both should be acid-modified so that economical disadvantage is involved. Therefore, these compositions are not necessarily satisfactory from an industrial viewpoint.

As a composition which is excellent from an economical standpoint, a resin composition comprising a polyphenylene ether, a polyarylene sulfide and a polyisocyanate compound is disclosed in Japanese Patent KOKAI No. 2-49023. However, it is described that the composition has a poor degree of compatibility.

SUMMARY OF THE INVENTION

An object of the present invention is to provide a resin composition having excellent economical and mechanical properties, especially having excellent impact strength which comprises as the main components a polyphenylene ether characterized by its heat resistance and mechanical properties and a polyarylene sulfide characterized by its solvent resistance, fire retardant properties, melt rheology, etc.

Under the situations, the present inventors have made extensive studies on resin compositions of polyphenylene ethers and polyarylene sulfides to achieve the foregoing object. As a result, it has been found that where a polyarylene sulfide having a high concentration of terminal SM group (wherein M represents hydrogen or an alkali metal) is used as the polyarylene sulfide component, a resin composition having an excellent impact strength can be obtained from an unmodified polyphenylene ether, irrespective of the terminal SM group being SH or forming a salt with an alkali metal such as SNa group, and that where a specific polyisocyanate is contained as a third component, a resin composition having a higher impact strength can be obtained. The present invention has thus come to be accomplished.

That is, the present invention relates to a resin composition comprising:

(A) a polyphenylene ether and,
(B) a polyarylene sulfide having the terminal SM group (wherein M represents hydrogen or an alkali metal) is at least $5 \times 10^{-6}$ gram equivalents/g.

The present invention also relates to a resin composition further containing (C) a polyisocyanate, in addition to the components (A) and (B) described above.

DETAILED DESCRIPTION OF THE INVENTION

The polyphenylene ether (A) in the present invention is a polymer comprising a recurring unit shown by general formula 1:

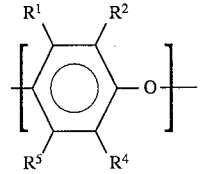

General formula 1 wherein $R^1$, $R^2$, $R^3$ and $R^4$ which may be the same or different, each represents a member selected from the group consisting of hydrogen atom a halogen atom, a hydrocarbon group, a substituted hydrocarbon group, a hydrocarbon oxy group and a substituted hydrocarbon oxy group.

Examples of the substituent in the substituted hydrocarbon group and substituted hydrocarbon oxy group include a halogen atom, a hydroxy group, an amino group, a nitro group, a cyano group, a carboxyl group, an amido group, an ether group, a sulfide group, a sulfone group, etc. which are thermally stable.

Specific examples of the polyphenylene ether containing the repeating unit shown by general formula 1 include poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-butyl-1,4-phenylene ether), poly(2,6-dipropenyl-1,4-phenylene ether), poly(2,6-dilauryl-1,4-phenylene ether), poly(2,6-diphenyl-1,4-phenylene ether), poly(2,6-dimethoxy-1,4-phenylene ether), poly(2,6-diethoxy-1,4-phenylene ether), poly(2-methoxy-6-ethoxy-1,4-phenylene ether), poly(2-ethyl-6-stearyloxy-1,4-phenylene ether), poly(2-methyl-6-phenyl-1,4-phenylene ether), poly(2-methyl-1,4-phenylene ether), poly(2-ethoxy-1,4-phenylene ether), poly(2-chloro-1,4-phenylene ether), poly(3-methyl-6-t-butyl-1,4-phenylene ether), poly(2,6-dichloro-1,4-phenylene ether), poly(2,5-dibromo-1,4-phenylene ether), poly(2,6-dibenzyl-1,4-phenylene ether) and various copolymers containing a plurality of the recurring units constituting these polymers. The copolymers include copolymers of a multi-substituted phenol such as 2,3,6-trimethylphenol, 2,3,5,6-tetramethylphenol, etc. and 2,6-dimethylphenol, and the like.

The polyphenylene ethers referred to in the present invention also cover modified polyphenylene ethers obtained by grafting the polyphenylene ethers described above with a styrene type monomer such as styrene, α-methylstyrene, etc.

Of these polyphenylene ethers, preferred are poly(2,6-dimethyl-1,4-phenylene ether) and a copolymer of 2,6-dimethylphenol and 2,3,6-trimethylphenol.

A preferred range of the molecular weight of the polyphenylene ether which can be used in the present invention varies depending upon purpose and is not generally determined. In general, however, the molecular weight is in the range of 0.1 to 0.7 dl/g, preferably in the range of 0.2 to 0.6 dl/g, when expressed by intrinsic viscosity measured in chloroform at 30° C.

Processes for preparing such polyphenylene ethers are known and described, for example, in U.S. Pat. Nos. 3,306,874, 3,306,875 and 3,257,357, Japanese Patent Publication KOKOKU No. 52-17880, Japanese Patent Publication KOKAI Nos. 50-51197 and 1-304119, etc.

The polyarylene sulfide (B) in the present invention in which the terminal SM group (wherein M represents hydrogen or an alkali metal) is at least $5 \times 10^{-6}$ gram equivalents/g refers to a polymer comprising the recurring unit shown by general formula 2 (wherein Ar represents a divalent aromatic residue) in which the terminal SM group (wherein M represents hydrogen or an alkali metal) determined by neutralization titration has a specific concentration, namely, $5 \times 10^{-6}$ gram equivalents/g or more, preferably $10 \times 10^{-6}$ gram equivalents/g or more:

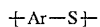    General formula 2 wherein Ar represents a divalent aromatic residue.

Examples of Ar include divalent aromatic residues shown by formulae 3 through 12 and nucleus-substituted residues thereof.

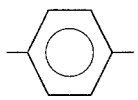    General formula 3

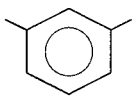    General formula 4

    General formula 5

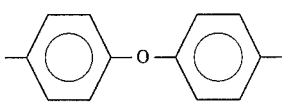    General formula 6

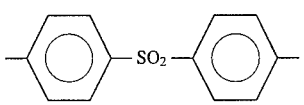    General formula 7

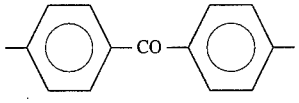    General formula 8

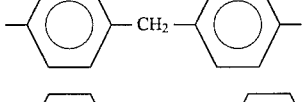    General formula 9

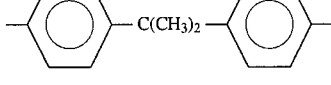    General formula 10

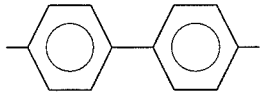    General formula 11

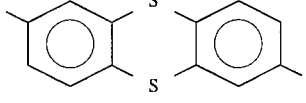    General formula 12

In addition to these divalent aromatic residues, polymers containing a small quantity of a trifunctional group shown by formula 13 are also included in the polyarylene sulfide of the present invention.

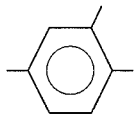    General formula 13

Specific examples of the polyarylene sulfide shown by general formula 2 include polyphenylene sulfide, poly(1,4-phenylenecarbonyl-1,4-phenylenesulfide), poly(1,4-phenylenesulfonyl-1,4-phenylenesulfide), poly(biphenylenesulfide), etc. Of these, preferred are polyarylene sulfides containing at least 50 mol % of the recurring unit shown by formula 14 and, polyphenylene sulfide is more preferred.

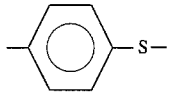    Formula 14

In general, the polyarylene sulfide described above is classified into two types of linear chain type and crosslinking type including partial crosslinking. In the present invention, both types are usable.

M in the terminal SM group which is present in the polyarylene sulfide (B) used for the resin composition of the present invention in the specific concentration described above is hydrogen or an alkali metal. Examples of the alkali metal are Na and K. In the resin composition of the present invention, both SM groups wherein M is hydrogen and an alkali metal are effective but it is preferred that at least a part of M be an alkali metal. A more preferred terminal group is SM group wherein at least substantially a part of M or the whole of M is Na. Where the concentration of the terminal SM group is less than $5 \times 10^{-6}$ gram equivalents/g, the object of the present invention which is to obtain a resin composition having a sufficiently high impact strength fails to be achieved and such a low concentration is not preferable. There is no particular limitation on the upper limit of concentration in the terminal SM group but the upper limit is generally $500 \times 10^{-6}$ gram equivalents/g or less, preferably $50 \times 10^{-6}$ gram equivalents/g.

The molecular weight of the polyarylene sulfide (B) is not particularly limited. In general, there are used polyarylene sulfides having a melt viscosity of 50 to 50,000 poise, preferably 100 to 30,000 poise, when measured at a temperature of 316° C. and a shear rate of 2000 $sec^{-1}$ with a flow tester, a capillary rheometer, etc.

These polyarylene sulfides (B) may be prepared, e.g., in a process which comprises reacting a polyhalogenated aromatic compound with a sulfur source such as an alkali sulfide, etc. in an organic polar solvent (U.S. Pat. Nos. 2,513,188 and 4,038,261, Japanese Patent Publication KOKOKU No. 44-27671), a process for preparing linear chain type polyarylene sulfides which comprises adding a carboxylic acid salt to the reaction system (Japanese Patent Publication KOKOKU No. 52-12240, Japanese Patent Publication KOKAI Nos. 51-144497 and 58-29822, Japanese Patent Publication KOKOKU No. 53-25880, etc.) or the like, by controlling reaction conditions such as a proportion of the polyhalogenated aromatic compound to the sulfur source, etc.

In the resin composition of the present invention, a ratio of the polyphenylene ether (A) to the polyarylene sulfide (B) formulated can be freely chosen depending upon purpose like heat resistance, fluidity, etc. but there is no particular restriction on the ratio. However, the weight ratio of the polyphenylene ether (A) to the polyarylene sulfide (B) is from 1:99 to 99:1, preferably 5:95 to 95:5, more preferably 8:92 to 65:35, % by weight, based on the total weight of the polyphenylene ether (A) and the polyarylene sulfide (B).

The polyisocyanate (C) in the present invention refers to an organic compound containing two or more isocyanate groups and/or isothiocyanate groups in the molecule thereof. Specific examples of such polyisocyanates include aromatic polyisocyanates such as m-phenylene diisocyanate, 2,4-toluylene diisocyanate, 2,6-toluylene diisocyanate, 4,4'-diphenylmethane diisocyanate, 4,4'-diphenylpropane diisocyanate, naphthalene-1,5-diisocyanate, 3,3'-dimethylbiphenyl-4,4'-diisocyanate, dimethyldiphenylmethane diisocyanate, diphenyl ether-4,4'-diisocyanate, diphenylsulfone-4,4'-diisocyanate, triphenylmethane triisocyanate, etc.; aromatic-aliphatic polyisocyanates such as xylylene diisocyanate, etc.; aliphatic polyisocyanates such as 4,4'-cyclohexane diisocyanate, dicyclohexylmethane-4,4'-diisocyanate, isophorone diisocyanate, 1,12-dodecane diisocyanate, hexamethylene diisocyanate, 2,4,4-trimethylhexamethylene diisocyanate, etc., and mixtures thereof, as well as compounds having an isothiocyanate group corresponding thereto. The polyisocyanates of the present invention also include polymers of these compounds, e.g., dimers, trimers, etc.; carbodiimide-modified type; modified polyisocyanates such as block type obtained by masking the isocyanate group with phenols, lactams, etc.

Among the polyisocyanates described above, preferred polyisocyanates are aromatic polyisocyanates and aliphatic polyisocyanates, more preferably 2,4-toluylene diisocyanate, 2,6-toluylene diisocyanate, 4,4'-diphenylmethane diisocyanate, 3,3'-dimethylbiphenyl-4,4'-diisocyanate, diphenyl ether-4,4'-diisocyanate, hexamethylene diisocyanate and isophorone diisocyanate, etc., most preferably 4,4'-diphenylmethane diisocyanate and polymethylene polyphenylene polyisocyanate.

Where the polyisocyanates (C) are used in the resin composition of the present invention, a preferred range of the proportion of the components used to exhibit the effect is not generally determined since the effect varies depending upon kind or composition of the polyphenylene ether (A) and the polyarylene sulfide (B) chosen, in addition to the kind of the component (C) itself. In general, however, the weight ratio of the polyisocyanate (C) is in the range of 0.01 to 30 parts by weight, preferably 0.1 to 20 parts by weight, more preferably 1 to 10 parts by weight, based on the total 100 parts by weight of the polyphenylene ether (A) and the polyarylene sulfide (B).

If necessary and desired, the resin composition of the present invention may contain fillers (D). Examples of such fillers are inorganic fibers such as glass fibers, potassium titanate fibers, rockwool, carbon fibers, etc.; organic fibers such as aromatic polyamide fibers, polybenzimidazole fibers, etc.; metal fibers such as stainless fibers, fibers of brass, zinc aluminum fibers, etc.; inorganic compound particles such as glass beads, asbestos, wollastonite, mica, talc, clay, calcium carbonate, magnesium hydroxide, silica, diatomaceous earth, etc.; metal particles such as aluminum flakes, zinc flakes, etc.; organic compound particles such as polyimide powders, etc. Of these fillers, preferred fillers are glass fibers.

For preparing the resin composition of the present invention, a variety of conventional processes such as solution blending, melt kneading, etc. are applicable but melt kneading is preferred. For melt kneading, the components described above are, for example, mixed with known mixing means used for mixing the resins with each other, the resin and liquid or solid additive, using a Henschel mixer, a super mixer, a ribbon blender, a V blender, etc. to form a homogeneous mixture; then, the mixture is kneaded by a kneading means using a Bambury mixer, a plast mill, a Brabender Plastograph, a single screw extruder, a twin screw extruder, etc.

Upon kneading, the temperature is chosen from the range of 150° to 400° C., preferably 200° to 350° C.

The addition of tertiary amines, quaternary ammonium salts, phosphines or imidazoles which are used as catalysts for promoting the reaction of the polyisocyanates (C) is not particularly restricted.

The resin composition of the present invention may also contain other substances, if necessary and desired. Examples of such additives include elastomers, flame retardants, stabilizers, plastics, lubricants, etc.

Examples of the elastomers include polybutadiene rubber, polyisoprene rubber, butyl rubber, ethylene-propylene copolymer rubber, ethylene-propylene-non-conjugated diene copolymer rubber, butadiene-styrene copolymer rubber, butadiene-acrylonitrile copolymer rubber, hydrogenated and non-hydrogenated styrene-conjugated diene block copolymer rubber, polyester rubber, acryl rubber, silicone rubber, and modified products thereof.

Among them, preferred elstomers are ternary copolymers obtained by copolymerization of diene compounds, ethylene-propylene copolymer rubbers including modified copolymers such as graft copolymers obtained by graft copolymerization of unsaturated monomers such as styrene, ethylene-propylene non-conjugated diene copolymer rubbers, and styrene-conjugated diene block copolymer rubbers such as styrene-isoprene diblock copolymers including hydrogenated copolymers such as partially hydrogenated ones, styrene-butadiene triblock copolymers, etc.

Examples of the flame retardants include phosphoric acid esters exemplified by triphenyl phosphate, tricresyl phosphate, a phosphate obtained from a mixture of isopropyl phenol and phenol, phosphates obtained from difunctional phenols such as benzohydroquinone or bisphenol A with other alcohols or phenols, etc.; brominated compounds such as decabromobiphenyl, pentabromotoluene, decabromodiphenyl ether, hexabromobenzene, brominated polystyrene, brominated epoxy resin, etc.; nitrogen-containing compounds such as melamine, melamine triisocyanurate, etc.

Other additives are illustratively given below. Examples of the stabilizers are sterically hindered phenols, organic phosphites, diazide oxalates, sterically hindered amines, etc. Specific examples of the lubricants are polyethylene wax, paraffin, etc.

The ratio of these other additives to be formulated can freely be chosen depending upon purpose, but as a general guideline when using these additives, the elastomers are incorporated in an amount of 100 parts by weight or less; the flame retardants in an amount of 30 parts by weight or less, preferably 1 to 20 parts by weight; the stabilizers in an amount of 20 parts by weight or less, preferably 0.001 to 10 parts by weight; and the lubricants in an amount of 2 parts by weight or less, based on the total 100 parts by weight of the polyphenylene ether (A) and the polyarylene sulfide (B).

The resin composition of the present invention is used for various cases, frames, connectors, switches and other mechanical parts in the electric, electronic and OA fields; magnet fly wheels, door mirror stays, lamp reflectors, cylinder head covers, various gears in the field of automobiles and vehicles; various housings, pulleys, handles, etc. in the mechanical field.

Hereinafter the present invention will be described in more detail with reference to the examples but is not deemed to be limited thereto.

Abbreviations used in the following Examples and Comparative Examples are as follows.

PPE: poly(2,6-dimethyl-1,4-phenylene ether) having a limiting viscosity of 0.46 dl/g when measured in chloroform at 30° C.
PPS-A: linear chain type polyphenylene sulfide having a melt viscosity of 2500 poise (at a temperature of 316° C. and a shearing rate of 1000 sec$^{-1}$) and the terminal SNa concentration of 15.2×10$^{-6}$ gram equivalents/g
PPS-B: crosslinking type polyphenylene sulfide having a melt viscosity of 200 poise and the terminal SNa concentration of 13.6×10$^{-6}$ gram equivalents/g
PPS-C: crosslinking type polyphenylene sulfide having a melt viscosity of 1000 poise and the terminal SNa concentration of 1.5×10$^{-6}$ gram equivalents/g
PPS-D: TOPREN T-4 [polyphenylene sulfide manufactured by TOPREN: terminal SNa concentration=3.3×10$^{-6}$ gram equivalents/g]
MDI: 4,4'-diphenylmethane diisocyanate
cMDI: polymethylene polyphenylene polyisocyanate [SIMUJURU 44V20, manufactured by Sumitomo Bayer Urethane K.K.]

In the Examples, data of Izod impact strength (3.2 mm thick, with and without notch), tensile property and flexural property are obtained by modification of the measurement methods designated in ASTM D256, ASTM D638 and ASTM D790 at 32° C. using test pieces prepared by injection molding.

The dispersed particle diameter of the polyphenylene ether dispersed in the continuous phase of the polyarylene sulfide was determined as follows. That is, a specimen for observation was prepared by subjecting trimming, etching with chloroform and gold deposition to the resin composition. A photograph of the specimen was taken by a scanning electron microscope and the diameter was calculated from the particle diameter (diameter corresponding to a circle) read from the photograph, according to Equation 1.

Equation 1

$$\text{Dispersed particle diameter} = \Sigma(di^4 \times ni)/\Sigma(di^3 \times ni)$$

wherein di is a particle diameter and ni is the number of di.

The terminal SM group of the polyarylene sulfide was quantitatively determined by the following neutralization titer.

[Assay for terminal SM group of the polyarylene sulfide]

After 20 g of finely divided polyarylene sulfide is dispersed in 200 ml of N-methylpyrrolidone, the mixture is stirred for 30 minutes while keeping at 200° C. in a nitrogen atmosphere.

After cooling, the mixture is filtered. Distilled water is added to the filtrate to make the volume 250 ml. 36% Hydrochloric acid aqueous solution is added to the resulting slurry until pH shows 3 to 4 followed by stirring for about 30 minutes. The filtration and the washing of the filtrate with distilled water are repeated until Cl$^{-1}$ ions in the filtrate are no longer detected. Then 30 ml of acetone is added to the filtrate to form a slurry and 400 ml of distilled water is added thereto. To the slurry is added 15 ml of N/10 sodium hydroxide aqueous solution. While monitoring pH with a pH meter, titration is made with N/10 sulfuric acid aqueous solution (factor=f) to determine titration value VA (ml) to the first point of inflexion at pH of about 8 to 9 and the second point of inflexion VB (ml) at pH of about 4 to 6. After the titration, the slurry is filtered and the filtrate is washed with water. After drying in an oven at 120° C. for 4 to 5 hours, the weight W (g) of the filtrate (polyarylene sulfide) is determined. The concentration C (gram equivalent/g) of the terminal SM group is determined according to Equation 2:

Equation 2

$$C = (VB - VA) \times f \times 100/W$$

REFERENCE EXAMPLE

A mixture of 100 parts by weight of PPS-A, 300 parts by weight of 5% HCl aqueous solution and 50 parts by weight of acetone was stirred for 10 hours under reflux. Filtration and washing with a solvent mixture of water and acetone were repeated until Cl$^{-1}$ ions were no longer detected. Then the mixture was dried at 100° C. in vacuum overnight to give PPS having the terminal SH group.

The product was designated PPS-AH.

EXAMPLE 1

A mixture of 40 parts by weight of PPE and 60 parts by weight of PPS-A was extruded at a barrel temperature of 300° C. using a single extruder of 40 mm diameter. The extruded strand was pelletized to obtain the resin composition of the present invention.

The dispersed particle diameter and Izod impact strength (without notch) of the composition were 6 μm and 38 kg·cm/cm, respectively.

EXAMPLE 2

The same procedures were carried out as in Example 1 except that PPS-AH was replaced for PPS-A. The resin composition of the present invention was thus obtained.

The dispersed particle diameter and Izot impact strength (without notch) of the composition were 7 μm and 30 kg·cm/cm, respectively.

COMPARATIVE EXAMPLE 1

The same procedures were carried out as in Example 1 except that PPS-D was replaced for PPS-A. The resin composition for comparison was thus obtained.

The dispersed particle diameter and Izot impact strength (without notch) of the composition were 12 μm and 15 kg·cm/cm, respectively.

EXAMPLE 3

Through a feeding port at the upstream of a double extruder of 50 mm diameter equipped with two feeding ports at the edge of the upstream side and at the center [TEM-50, manufactured by Toshiba Machine Co., Ltd.], 20 parts by weight of PPE, 80 parts by weight of PPS-B and 3 parts by weight of MDI were supplied and extruded at a barrel temperature of 320° C. The extruded strand was pelletized to obtain the resin composition of the present invention.

The dispersed particle diameter and Izod impact strength (without notch) of the composition are shown in Table 1.

EXAMPLES 4 AND 5 AND COMPARATIVE EXAMPLE 2

The same procedures were carried out as in Example 3 except that the polyphenylene ether, polyarylene sulfide and polyisocyanate and the proportion thereof were changed as shown in Table 1. The resin compositions were thus obtained.

The dispersed particle diameter and physical properties of each composition are shown in Table 1.

EXAMPLE 6

While continuously supplying 30 parts by weight of PPE, 70 parts by weight of PPS-B and 3 parts by weight of cMDI through the feeding port at the upstream of the double extruder used in Example 3 and 66.7 parts by weight of glass fibers (chopped) of 3 mm length through the feeding port at the center, extrusion was made at a barrel temperature of 320° C., with maintaining the proportion. The extruded strand was pelletized to obtain the resin composition of the present invention.

The Izod impact strength (with notch), tensile strength, flexural strength and flexural modulus of the composition were 6 kg/cm/cm, 1290 kg/cm$^2$, 1650 kg/cm$^2$ and 119000 kg/cm$^2$, respectively.

TABLE 1

| | Formulation | | | | | | Particle size | Izod Impact |
|---|---|---|---|---|---|---|---|---|
| | PPE | | PPS | | MDI or cMDI | | | |
| No. | Kind | part by wt | kind | part by wt | kind | part by wt | dispersed μm | Strength kg · cm/cm |
| Example 3 | PPE | 20 | PPS-B | 80 | MDI | 3 | 0.9 | 21 |
| Example 4 | PPE | 35 | PPS-B | 65 | cMDI | 3 | 0.8 | 27 |
| Example 5 | PPE | 50 | PPS-B | 50 | cMDI | 3 | 1.5 | 20 |
| Comparative Example 2 | PPE | 50 | PPS-C | 50 | cMDI | 3 | 4 | 13 |

The thus obtained resin composition of the present invention provides excellent impact strength and economical properties and can therefore be molded by various molding techniques such as extrusion molding, injection molding, blow molding, etc. The molded articles prepared from the resin composition of the present invention are provided to the market as a variety of resin articles. Accordingly, the present invention is of great value from an industrial viewpoint.

What is claimed is:

1. A resin composition consisting essentially of (A) a polyphenylene ether which is unmodified or modified by grafting unmodified polyphenylene ether with a styrene monomer, (B) a polyarylene sulfide having the terminal SM group (wherein M is hydrogen or an alkali metal) of at least $10 \times 10^{-6}$ gram equivalent, and (C) a polyisocyanate compound.

2. A resin composition according to claim 1, wherein said polyphenylene ether (A) is poly(2,6-dimethyl-1,4-phenylene ether).

3. A resin composition according to claim 1, wherein said polyarylene sulfide (B) is polyphenylene sulfide.

4. A resin composition according to claim 1, wherein said polyisocyanate is selected from the group consisting of 2,4-toluylene diisocyanate, 2,6-toluylene diisocyanate, 4,4'-diphenylmethane diisocyanate, 3,3'-dimethylbiphenyl- 4,4'-diisocyanate, diphenyl ether-4,4'-diisocyanate, hexamethylene diisocyanate, isophorone diisocyanate and polymethylene polyphenylene polyisocyanate.

5. A resin composition according to claim 1, wherein said polyisocyanate is polymethylene polyphenylene polyisocyanate.

6. A resin composition according to claim 1, wherein a part or whole of said terminal SM group is SNa group.

7. A resin composition consisting essentially of (A) a polyphenylene ether which is unmodified or modified by grafting unmodified polyphenylene ether with a styrene monomer, (B) a polyarylene sulfide having the terminal SM group wherein M is hydrogen or an alkali metal) of at least $10 \times 10^{-6}$ gram equivalents/g, (C) a polyisocyanate compound, and (D) a filler.

8. A resin composition according to claim 7, wherein said filler (D) is glass fibers.

* * * * *